United States Patent
Perry

[11] 4,067,043
[45] Jan. 3, 1978

[54] OPTICAL CONVERSION METHOD

[75] Inventor: William E. Perry, LaPorte, Tex.

[73] Assignee: The United States of America as represented by the Administrator of the National Aeronautics and Space Administration, Washington, D.C.

[21] Appl. No.: 651,007

[22] Filed: Jan. 21, 1976

[51] Int. Cl.$^2$ ............................................... H04N 9/04
[52] U.S. Cl. ........................................ 358/55; 358/41; 358/225; 350/159
[58] Field of Search ....................... 358/41, 43, 44, 55, 358/225, 228; 178/DIG. 29; 350/147, 148, 159, 150; 354/227; 351/25, 26; 356/114; 250/225

[56] References Cited
U.S. PATENT DOCUMENTS

| 2,586,635 | 2/1952 | Fernsler | 358/43 X |
| 2,901,539 | 8/1959 | Morgan | 178/DIG. 29 |

Primary Examiner—Richard Murray
Attorney, Agent, or Firm—Carl O. McClenny; John R. Manning; Marvin F. Matthews

[57] ABSTRACT

Disclosed is a method for converting an optical system, employing an electrooptic device in conjunction with a pair of crossed polarizing devices, between an activated mode and a deactivated mode. Embodiments in which the optical system is used as a neutral density filter, a selective color filter, or a light shutter, as applied to a television camera are described in which the electrooptic device and the polarizing analyzer are fixed with respect to the television camera, and the first polarizing device is selectively positioned in, or removed from, the optical path of the optical system to activate or deactivate the optical system, respectively. Where the optical system is used as a selective color filter to produce light beams of alternating colors in a field sequential color television system, deactivation of the optical system renders the television a black-and-white system.

5 Claims, 2 Drawing Figures

OPTICAL CONVERSION METHOD

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field of the Invention

The present invention relates to methods of activating and deactivating optical systems. More particularly, the present invention pertains to the method of emplacing or removing a polarizing device used in an optical system that is applied as a neutral density filter, a selective color filter, or a light shutter, to a television pickup camera, to activate or deactivate the optical system, respectively.

2. Description of the Prior Art

In many applications of television, there is a need to switch between a high resolution monochrome television system and a color system. There are also times when neutral density filters must be added to or removed from the television pickup camera, and there are occasions to protect the television camera from damage due to light saturation. Currently, the application of color filters, or a neutral density filter, for a television camera is usually done by mechanical means involving multiple filters. The conversion from a color television system to a monochrome system is performed either electronically or by using monochrome television monitors. In a given case, the techniques may be complex and expensive, and particularly undesirable for use in space applications. The conversion of a television system in space by an astronaut must be accomplished by a method which is relatively troublefree, inexpensive, and simple enough to allow the astronaut to accomplish the conversion despite the hostile environment of space.

SUMMARY OF THE INVENTION

The use of an optical system comprising an electrooptic device located between crossed polarizing devices to control light propagated generally along the optical axis of such a system is well known in the art. With the electrooptic device in an isotropic state, for example, the crossed polarizers cooperate to block out all of the visible light. By polarizing the electrooptic device along a direction perpendicular to the optical axis of the system by appropriately applying an electric field across the electrooptic device, the plane of polarization of the light, as determined by the first polarizer, may be effectively rotated to allow passage of varying amounts of light by the second polarizer, dependent on the electric field strength, thereby establishing the optical system as a neutral density filter. The maximum percentage of light intensity passed by the optical system is determined by the geometry of the system and the strength of the electric field applied to the electrooptic device. With the electric field strength that maximizes light transmission identified, the optical system may be conveniently used as a light shutter by turning the electric field on or off. By increasing the electric field across the electrooptic device still further, this device acts as a wavelength-dependent retardation plate with the result that the optical system becomes a selective color filter.

In the present invention, the electrooptic device and the second polarizer are both aligned along the optical axis of a television pickup camera, and fixed with respect to the camera. No optical effect occurs to light passing through the combination of only the electrooptic device and a single polarizer, with the exceptions of polarization of the light and a possible loss in light intensity. Consequently, without the first polarizing device in position along the optical axis of the optical system, the optical system is effectively deactivated, no matter which of the aforementioned applications of the optical system is to be used in conjunction with the television camera. Depending upon the use to which the optical system is to be put with respect to the television camera, the electric field across the electrooptic device may be pre-set at an appropriate value to achieve the desired end. To activate the optical system, the first polarizing device is then placed in position along the optical axis of the optical system. The optical system is deactivated by the simple method of removing the first polarizer from its position along the optical axis.

DESCRIPTION OF PREFERRED EMBODIMENTS

Figure 1:
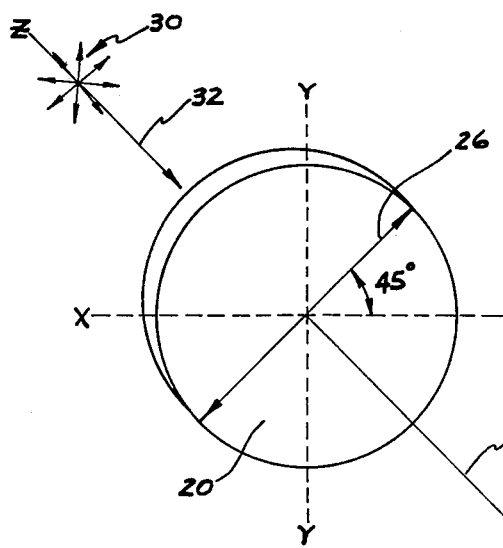
FIG. 1 is a schematic diagram in perspective showing the primary elements of the optical system in the activated condition.

The elements of a typical optical system used in the present invention are shown in FIG. 1. A first polarizer 20, an electrooptic device 22, and a second polarizer, or analyzer, 24 are arranged in that order along a line Z—Z, which marks the optical axis of the optical system. The two polarizers 20 and 24 and the electrooptic device 22 each lie in separate planes perpendicular to the optical axis Z—Z. Coordinate axes X—X and Y—Y indicate directions mutually orthognal with the Z—Z line. The two polarizers 20 and 24 are oriented with their polarization directions, 26 and 28, respectively, disposed at 90° with respect to each other in the crossed polarizers arrangement. The polarization direction 26 is shown oriented at an angle of 45° with respect to the X—X axis of the first polarizer 20. The polarization direction 28 is shown oriented at an angle of 135° with respect to the X—X axis of the second polarizer 24.

Natural, or unpolarized, light, indicated by the pattern at 30, enters the optical system generally along the Z—Z line from a scene to be televised (not shown). The light 30 from the scene is incident on the first polarizer 20 as indicated by arrow 32, and emerges from the first polarizer, arrow 34, linearly polarized parallel to the polariazation direction 26 of the first polarizer. If, as the light then passes through the electrooptic element 22, its polarization is unchanged, then the light is incident on the second polarizer 24, arrow 36, still linearly polarized parallel to the first polarization direction 26. Since the polarization direction 28 of the second polarizer 24 is 90° with respect to the first polarization direction 26, no light is transmitted by the second polarizer. This condition is the OFF condition of the optical system used as a light shutter. However, when the electrooptic element 21 is made optically birefrigent with optic axis OA direction parallel to the Y—Y axes as shown, the electrooptic device 22 affects the polarization of the light incident thereon, arrow 34, as a retardation plate. Then the plane of polarization of the light passing through the electrooptic device 22 is effectively rotated through some angle, dependent upon the degree of polarization of the electrooptic device as well as its thickness in a well known manner. With proper selection of parameters, the plane of polarization of light passing through the electrooptic device 22 will be rotated 90° from the polarization direction 26 to the polarization direction 28. This condition is the ON state of the light shutter since then the second polarizer 24 transmits virtually all of the light incident thereon.

The electrooptic device 22 may be of any suitable construction and composition that permits control over the degree and orientation of the birefringence of the electrooptic device. It is well known that a plate of lead lanthanum zirconate titanate (PLZT) may be constructed to fulfill these requirements. Such a plate is normally optically isotropic, but becomes optically anisotropic in an external electric field. The anisotropy is in the form of uniaxial birefringence with optic axis along the direction of the applied electric field, and with the degree of polarization proportional to the square of the electric field strength. At some specific value of the applied electric field, determined by the geometry of the electrooptic device 22, the polarization direction of the light emerging from the electrooptic device, arrow 36, is changed from the direction 26 of the first polarizer 20 to the direction 28 of the second polarizer 24 to achieve the ON state. At intermediate values of the applied electric field between zero and the ON state value, the polarization of the light passing through the electrooptic device 22 is affected to cause alignment of only a component of the light polarization direction with the polarization direction 28 of the second polarizer, depending on the electric field strength. Consequently, as the degree of polarization of the electrooptic device 22 is increased from that of the OFF state to that of the ON state, the amount of light transmitted by the second polarizer 24, arrow 38, increases from zero to the maximum occurring in the ON state.

Another feature of the PLZT electrooptic device 22 is that the visible-spectrum optical density of the electrooptic device changes from a high value (low transmittance) in the zero field mode, to increasingly lower values (higher transmittance) as the applied electric field is increased to the value required for the ON state. The dependence of both the degree of polarization and the optical density of the PLZT electrooptic device 22 on the applied electric field between the OFF state and the ON state permits the use of the optical system as a neutral density filter.

While the transmittance-versus-wavelength curve for the entire optical system is flat for all values of the applied electric field ranging from zero to the ON state value, increasing the applied electric field beyond the ON state causes the retardation by the PLZT electrooptic device 22 to become wavelength-dependent with the result that the optical system may be used as a selective color filter. With appropriate electric field values identified to obtain the particular optical color filtering necessary to produce electronic color television signals, these electric field values may be sequentially applied to the electrooptic device 22 in synchronism with the rest of the television system electronics.

The electric field applied to the PLZT electrooptic device 22 to produce the desired polarization is generated by a voltage source (not shown) connected to terminals T1 and T2 which lead to interleaved sets of electrodes 40 and 42, respectively. The electrodes 40 and 42 are oriented to effect an electric field along the direction of the desired optic axis OA of the electrooptic device 22, and may be constructed on the electrooptic device by deposition, painting, or any other appropriate method known in the art. The material of which the electrodes 40 and 42 is composed must be virtually transparent to visible light. Other arrangements of electrodes known in the art may be utilized as particular geometries of the electrooptic device 22 require. For example, sets of electrodes similar to 40 and 42, and likewise connected to the terminal T1 and T2, respectively, may also be constructed on the opposite side of the electrooptic device 22. The electric field may also be applied to the electrooptic device 22 through a pair of electrodes constructed on the electrooptic device above and below the area occupied by the light path, or in any other appropriate fashion to achieve the desired optical effects, as known in the art. The method of the present invention is not restricted to the form or composition of the electrodes 40 and 42 as shown in FIG. 1.

Figure 2:
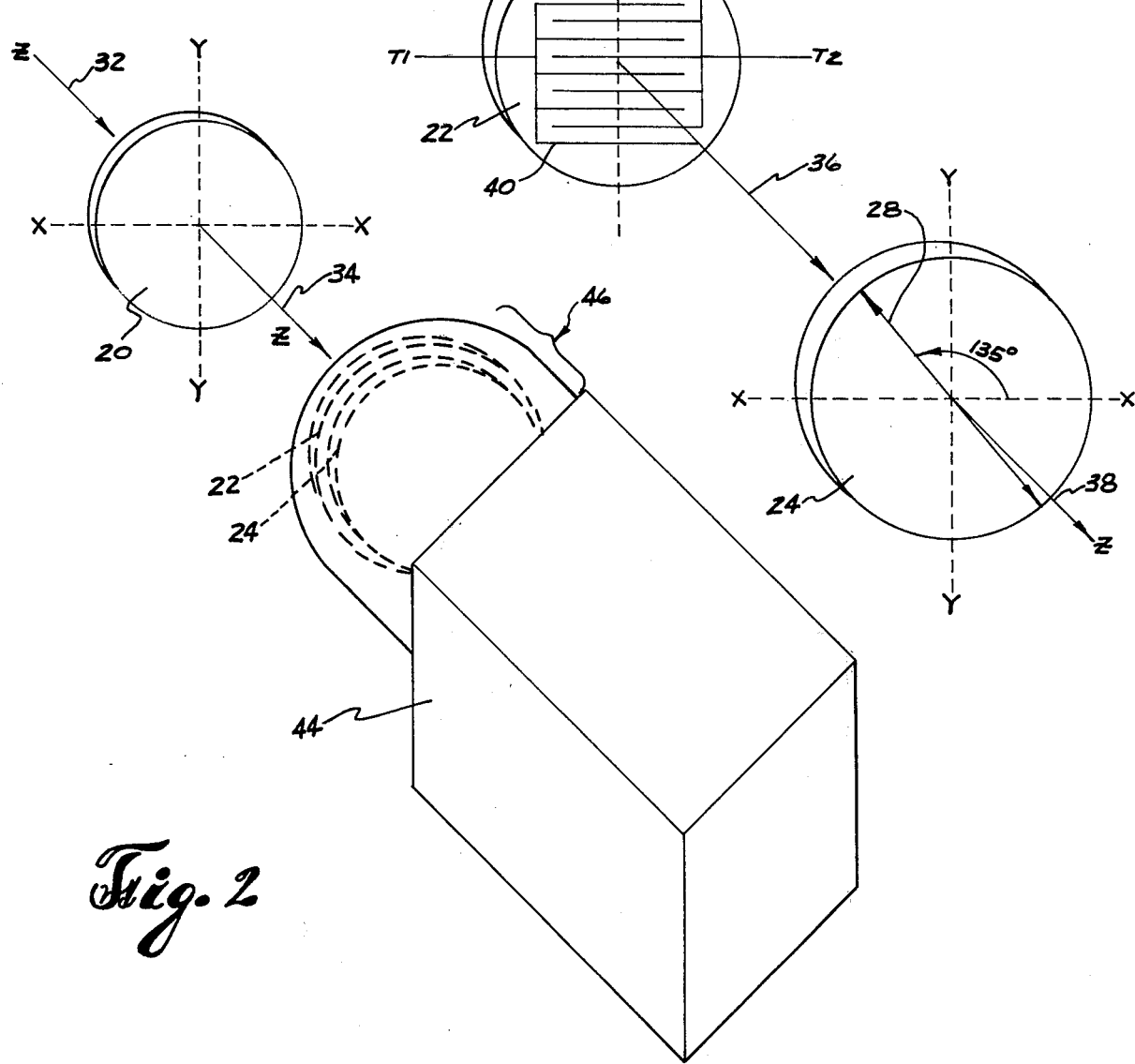
FIG. 2 is a schematic representation in perspective showing the incorporation of the electrooptic device and second polarizer within the lens assembly of a television camera.

In FIG. 2, the optical system is shown adapted for use with a television pickup camera 44. The optical axis Z—Z of the optical system of FIG. 1 coincides with the optical axis of the lens system (now shown) in the optical signal pickup of the camera 44. The electrooptic device 22 and the second polarizer 24 are indicated as incorporated within, an otherwise standard lens assembly 46 used with the television camera 44, and all light transmitted by the lens system (not shown) must pass through the electrooptic device and the second polarizer. The first polarizer 20 is shown disengaged from the television camera 44 and its lens assembly 46. This representation is used to indicate that the first polarizer 20 may be placed in position along the line of the optical axis Z—Z of the optical system as shown in FIG. 1, to constitute the activated mode of the optical system, or the first polarizer 20 may be removed from the optical system altogether, constituting the deactivated mode of the optical system. In the activated mode the first polarizer 20 must be oriented with respect to the second polarizer 24 to achieve the crossed polarizers arrangement. The positioning and removal of the first polarizer 20 to achieve the activated or deactivated mode as desired may be achieved manually or by some indirect means, as the particular application merits. Also, the method of fixing the first polarizer in position in the activated mode may be determined by the individual case, and is not a part of the present invention. It will also be appreciated that, in a given case, additional optical elements may be required to achieve the desired goal of the application.

The method of the present invention is to convert the optical system to an activated mode by placing the first polarizer 20 in position along the optical axis Z—Z of the optical system, and to convert the optical system to a deactivated mode by removing the first polarizer 20 from this position. In the application of the optical system to a television pickup camera 44 as shown in FIG. 2, any of the aforementioned uses of the optical system may be employed. In the case of a light shutter, the OFF state is achieved to block out incident light from the television camera 44 only when the first polarizer 20 is in place to activate the optical system by effecting the crossed polarizers arrangement with the second polarizer 24. Then, the ON state may be effected by the application of a proper electric field to the electrooptic device 22. Removal of the first polarizer 20 to deactivate the optical system results in incident light passing through the remainder of the optical system with or without the aforementioned electric field applied to the electrooptic device 22. Similarly, when the optical system is used as a neutral density filter, whose optical density is determined by the value of the electric field applied to the electrooptic device 22, the contribution of the light polarization effect to the optical density variation of the optical system is virtually lost with the removal of the first polarizer 20 from the optical axis Z—Z. Only the variation in optical density of the electrooptic device 22 as caused by the applied electric field causes any substantial variation in the percentage of incident light that is transmitted by the remainder of the optical system to the television camera 44. Since removal of the first polarizer 20 results in natural light falling on the electrooptic device, no matter what electric field setting is used on the electrooptic device 22 in the selective color filter range, all colors of light are transmitted by the electrooptic device with no preferred polarization orientation. Consequently, when such light is incident on the second polarizer 24, the effect is transmission of light of all colors polarized along the polarization direction 28 of the second polarizer. Thus, the selective color filter application of the optical system to produce a single color tint for the television pickup camera 44, as well as the sequential color selection to produce color television signals, is rendered inoperative by the removal of the first polarizer 20 with the result that the television pickup camera 44 produces only black-and-white electronic television signals.

It will be appreciated that the method of the present invention may be employed in the application of any similar optical system that employs an initial polarizing device 20, regardless of the type of polarizing devices used. The present invention is not restricted to either the composition and construction of the optical system elements described herein, or to any particular applications of the optical system. Furthermore, the present invention may be employed with optical systems that are used in circumstances other than in a television system as illustrated herein.

The foregoing disclosure and description of the invention is illustrative and explanatory thereof, and variations in the method will be apparent to those skilled in the art, and may be made within the scope of the appended claims without departing from the spirit of the invention.

I claim:

1. The method of selectively activating and deactivating an optical system, which comprises electrooptic means located between crossed polarizing devices comprising first polarizing means and second polarizing means all positioned along a common optical axis, comprising the steps of activating said optical system by positioning said first polarizing means along said optical axis of said optical system so that light incident on said electrooptic means must first pass through said first polarizing means, and deactivating said optical system by removing said first polarizing means from said optical axis of said optical system.

2. The method of selectively activating and deactivating an optical neutral density filter, in combination with a television camera, and comprising an electrooptic device located between crossed polarizing devices comprising a first and second polarizing device all positioned along a common optical axis comprising the steps of activating said optical neutral density filter by positioning said first polarizing device along said optical path of said neutral density filter, and deactivating said neutral density filter by removing said first polarizing device from said optical path of said optical neutral density filter.

3. The method of selectively activating and deactivating a selective color filter, in combination with a television camera, and comprising an electrooptic device located between crossed polarizing devices comprising a first and second polarizing device all positioned along a common optical axis comprising the steps of activating said selective color filter by positioning said first polarizing device along said optical path of said selective color filter, and deactivating said selective color filter by removing said first polarizing device from said optical path of said selective color filter.

4. The method of selectively activating and deactivating a light shutter, in combination with a television camera, and comprising an electrooptic device located between crossed polarizing devices comprising a first and second polarizing device all positioned along a common optical axis comprising the steps of activating said light shutter by positioning said first polarizing device along said optical path of said light shutter, and deactivating said light shutter by removing said first polarizing device from said optical path of said light shutter.

5. The method of switching a television system between a color mode and a black-and-white mode said television system having an optical pickup comprising an electrooptic device located between crossed polarizing devices comprising a first and second polarizing means all positioned along a common optical axis and capable of producing sequential color light signals, comprising the steps of converting said television system to said color mode by placing said first polarizing means along said optical path of said optical signal pickup, and converting said television system to said black-and-white mode by removing said first polarizer from said optical path of said optical signal pickup.

* * * * *